Sept. 19, 1967              C. GILLET              3,342,109
PROCESS FOR REGULATING THE WIDTH OF METALLIC STRIPS OR BANDS
DESIGNED FOR MANUFACTURING TUBES OR OTHER STRUCTURAL
SHAPES, AND MACHINE TO PUT THE PROCESS
INTO OPERATION
Filed Sept. 21, 1965                            5 Sheets-Sheet 1
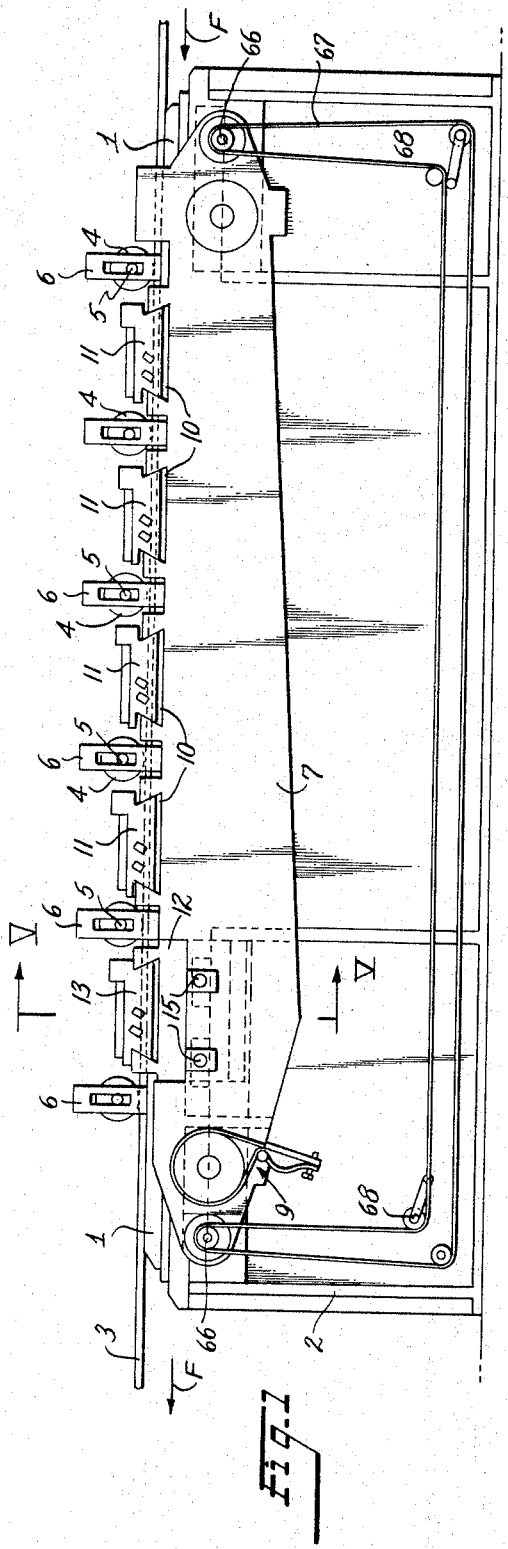
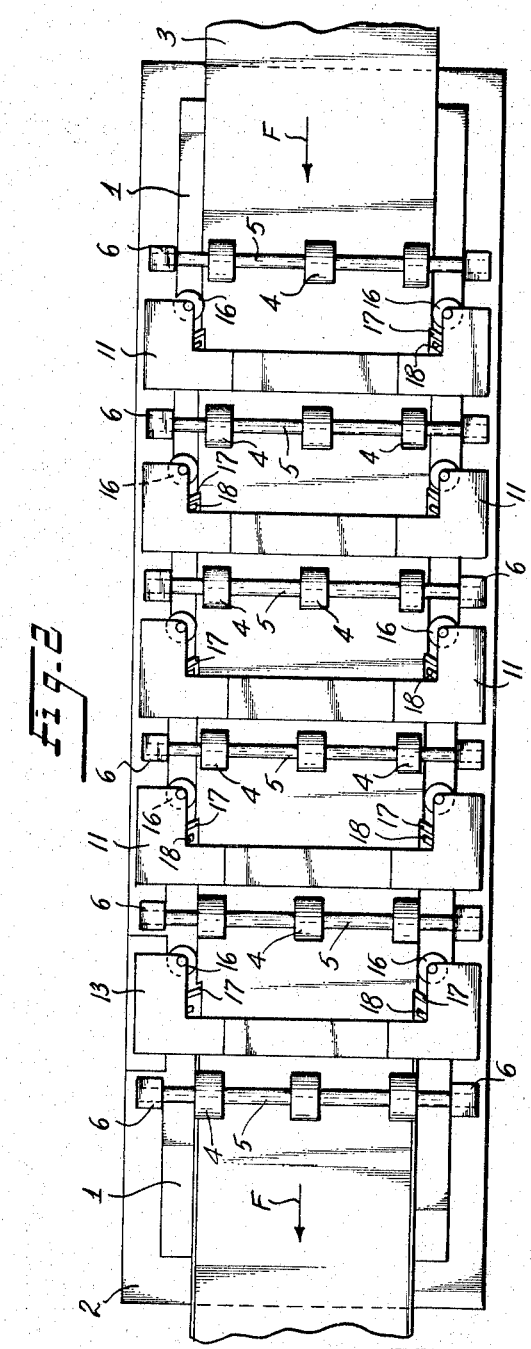
INVENTOR
CHARLES GILLET
BY Holcombe, Wasserill & Brisebois
ATTORNEYS Sept. 19, 1967 C. GILLET 3,342,109
PROCESS FOR REGULATING THE WIDTH OF METALLIC STRIPS OR BANDS
DESIGNED FOR MANUFACTURING TUBES OR OTHER STRUCTURAL
SHAPES, AND MACHINE TO PUT THE PROCESS
INTO OPERATION
Filed Sept. 21, 1965 5 Sheets-Sheet 2
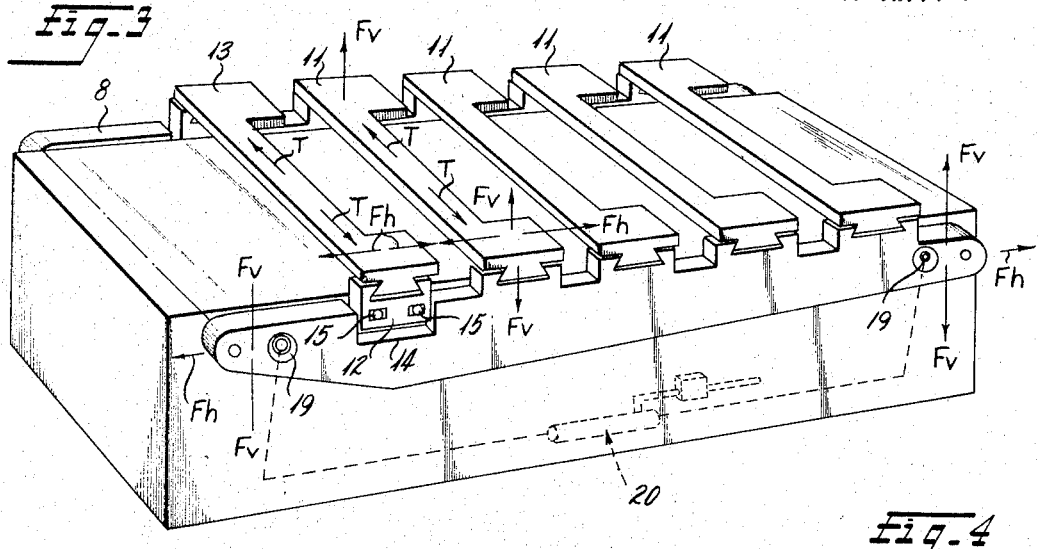
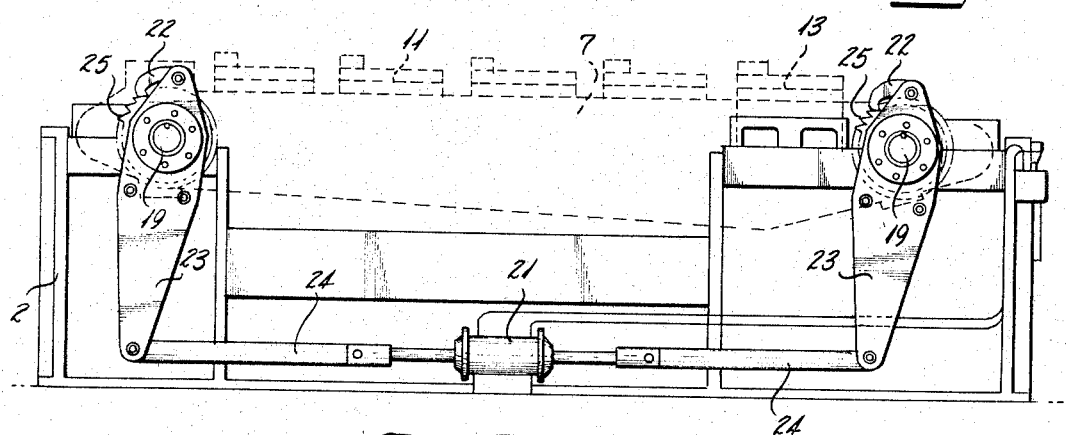
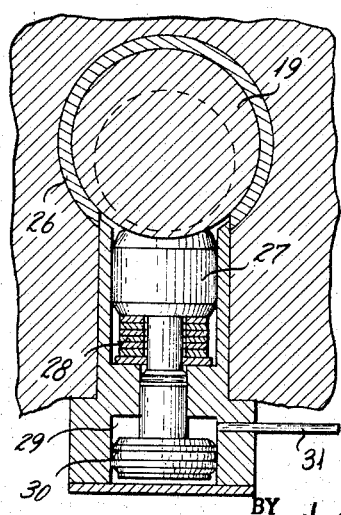
INVENTOR
CHARLES GILLET
BY
ATTORNEYS

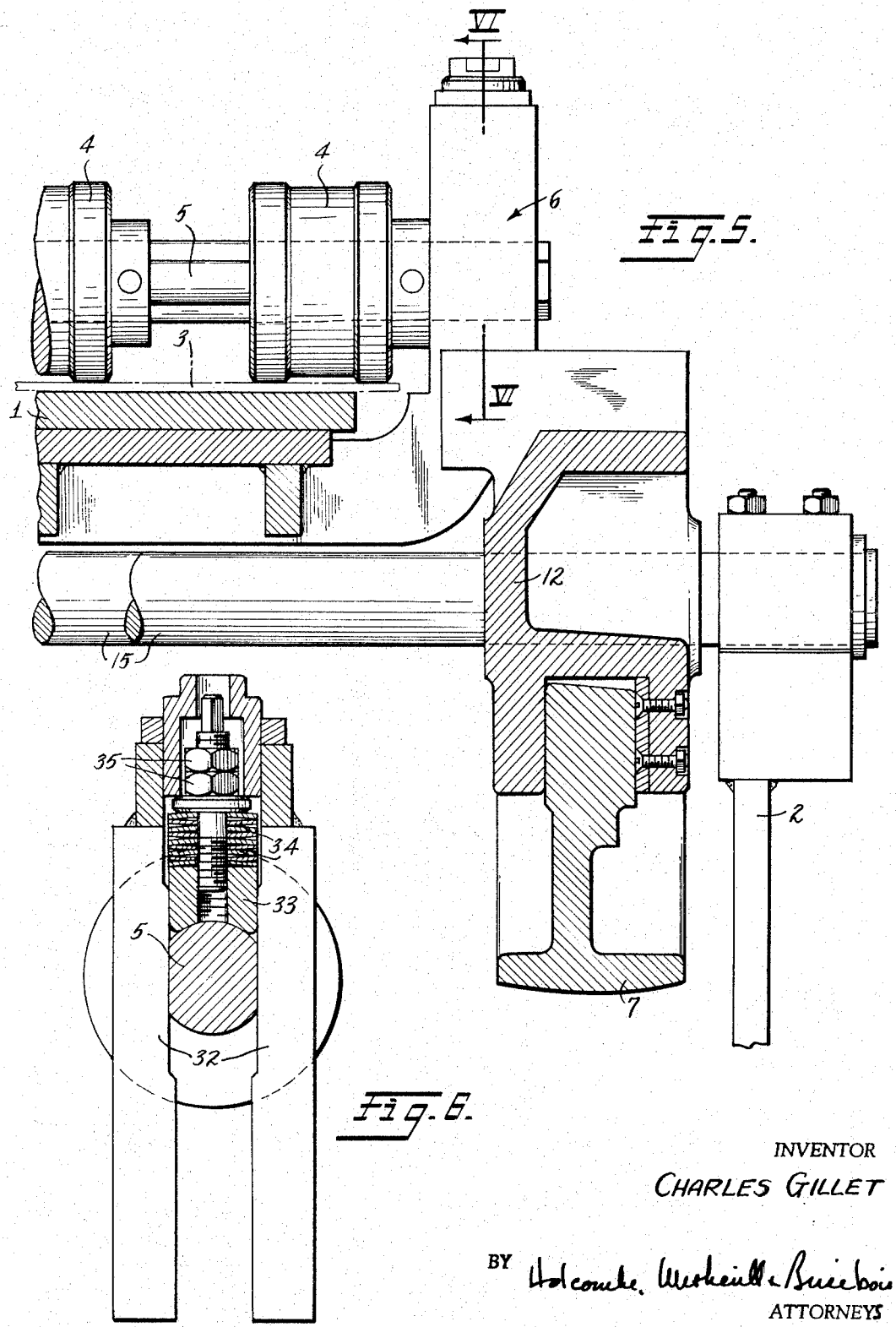

INVENTOR
CHARLES GILLET

BY Holcombe, Wekewill + Brisebois
ATTORNEYS

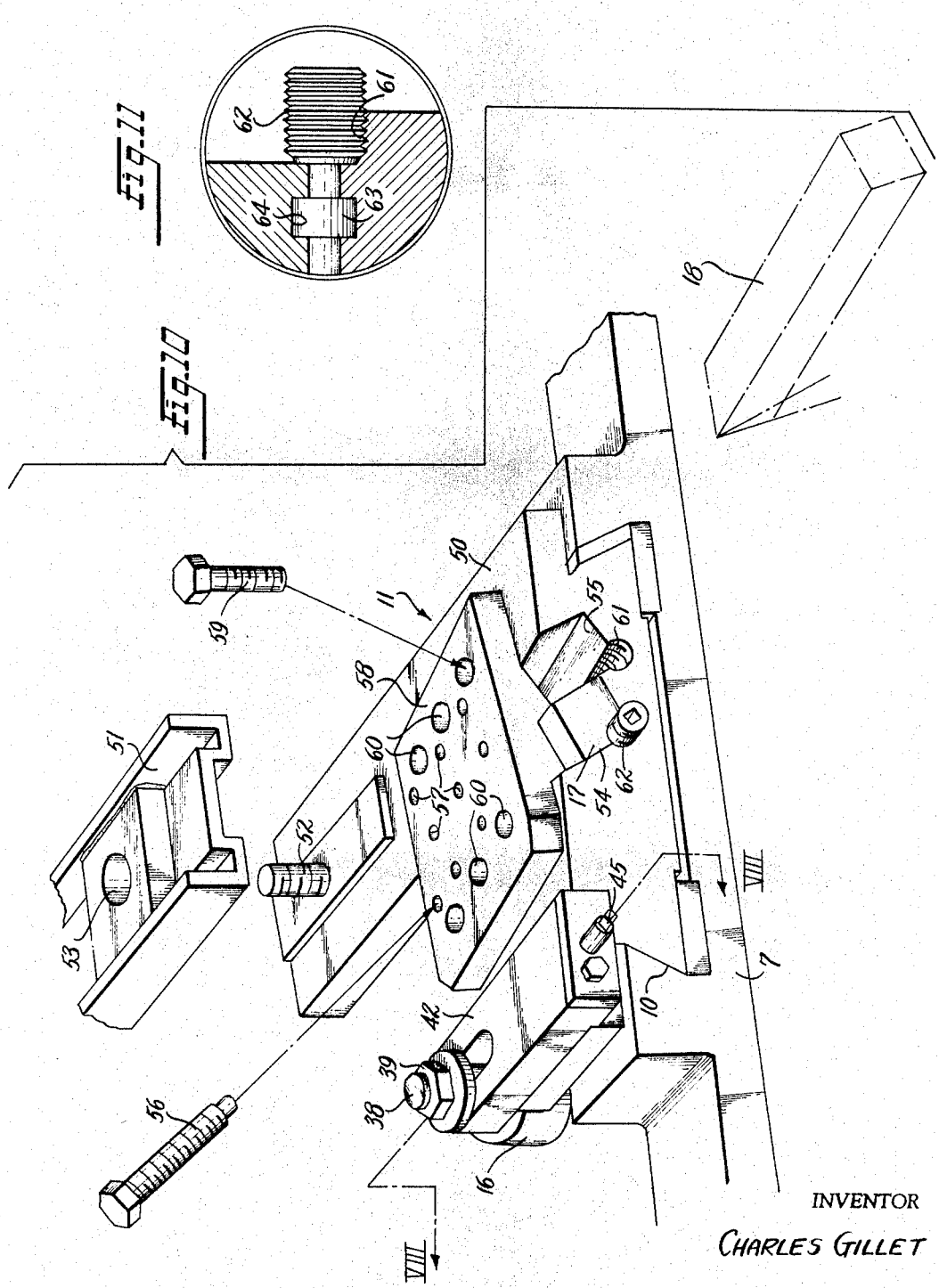

United States Patent Office 3,342,109
Patented Sept. 19, 1967

3,342,109
PROCESS FOR REGULATING THE WIDTH OF METALLIC STRIPS OR BANDS DESIGNED FOR MANUFACTURING TUBES OR OTHER STRUCTURAL SHAPES, AND MACHINE TO PUT THE PROCESS INTO OPERATION
Charles Gillet, Paris, France, assignor to Societe anonyme dite: Vallourec
Filed Sept. 21, 1965, Ser. No. 488,882
Claims priority, application France, Sept. 29, 1964, 989,753
18 Claims. (Cl. 90—24)

It is known that in order to manufacture structural shapes such as welded tubes, it is desirable, and often even indispensable, to begin with metal strips or bands having a constant width. Now, these elongate strips or bands, which are usually obtained by rolling, must in general undergo machining along their edges in order to possess a constant width. Also, it is desirable, notably when one wishes to form welded tubes with more or less critical thickness with respect to their diameter, to impart a shape of trapezoidal cross section to the metallic bands utilized in order to avoid creating a flange inside the tube at the line of welding.

Devices comprising shears with rotating circular blades, which permit the marginal edges of the metallic bands to be cut away, are already known. But these devices do not give satisfaction, because on the one hand they are of delicate usage, and on the other hand, the operation of shears with circular blades implies a considerable loss of metal due to the fact that the line of cut cannot be entirely in proximity with the edges of the band if it is desired to accomplish the cutting under satisfactory conditions.

Equally well known are devices named "edge scrapers," which have two pairs of smoothing tools between which the band is caused to pass, in such a way as to eliminate the excess metal with respect to the intended width of the band.

These edge scrapers present the advantage of holding to a limit the loss of metal, and of allowing easily the obtaining of oblique shape, but their utilization presents important drawbacks which make their operation quite uncertain.

In the first place, the incurving stress of the machined metallic bands incurs a very irregular distribution of the removal of the metal by the different tools, and this to such a degree that certain particularly inwardly strained bands can no longer be machined on the machines provided for this purpose. In addition, the evacuation of the shavings is difficult, inasmuch as there is relatively frequent tamping that requires stopping the machine.

Finally, the polishing and smoothing tools undergo quite rapid wear, in this creating disturbances in exchanging tools without stopping the machine.

The present invention concerns a new process to scrape the edges of the metallic strips or bands, as well as a machine designed to put the process in operation.

The present invention has for an object a new process to effect machining of the edges of a metallic band to which it is desired to give a constant width, this process being essentially characterized by the fact that the band is carried along in the direction of its length while maintaining it in a given plane with the aid of any device whatever, and that the edges of this band are subjected to the action of smoothing tools, mounted in pairs, one tool on either side of the band, each pair of tools being capable of moving freely transversely to the band in order to follow its bends by virtue of a pair of rollers on either side of the band.

The separation between the tools of the pairs acting successively on the band diminishes progressively, in such a way as to correspond to the separation at maximum tolerance of the width of the initial band in order to converge at the exact width which the metallic band must have at the end of machining. Normally the separation between two rollers of a tool carrier is very slightly higher or preferably equal to the separation of the tools of the carriage which precedes it.

In one preferred method of putting the process into operation according to the invention, a forward and backward movement with respect to the plane of the band is given to the cutting tools, so as to regularly distribute the wear on the tool on its entire edge length.

Conforming to another characteristic of the invention, the edge of each tool is inclined freely with respect to the plane of the band, so as to disengage the shavings toward the bottom. Also the relative positions of the different parts of the machine are such that the fall of the shavings is effected freely into a vat or reception tank from where they can be extracted easily.

With the process according to the present invention one can proceed to a machining of the band to provide a trapezoidal section by suitably inclining the edges of the tools of the last pair or pairs. In this case, and when it is an objective, conforming to the invention, to impart to the tools, an oscillating movement with respect to the plane of the band, it is necessary either to damp this oscillating motion for the tools assuring machining along the trapezoidal section, or to again vary the separation of these tools as a function of their displacement with respect to the plane of the band, in such a way as to maintain constant the machined trapezoidal section.

Conforming to a preferred method of putting the invention into operation, there is mounted on the same tool carrying carriage not only one but two pairs of tools, so that, by the help of an appropriate device, the two pairs of tools can be made to act alternately, which permits easy replacement of the pair of nonworking tools, without the necessity of interrupting the work of the machine.

The present invention has also for an object the provision of a new industrial device which constitutes a machine to polish metallic bands, this machine being essentially characterized by the fact that it comprises in combination: a fixed horizontal table to which the metallic band is fed by a succession of presser-rollers, the band being carried along by any sort of means, a pair of stringers or side-frames placed on either side of the metallic band, and tool carriers supported by the stringers while being capable of sliding freely perpendicularly to the direction of the movement of the band, each of these tool-carrying carriages being supplied with a pair of rollers placed on either side of the metallic band, and carrying polishing tools arranged so as to be able to machine both edges of this band.

In one preferred method of operation of the machine according to the present invention, the two stringers are supported by eccentrics which give them a circular movement of translation of small amplitude with respect to the table on which the strip or band is moved.

The movement of the eccentrics can be advantageously controlled by a ratchet device carried along by a pneumatic or hydraulic cylinder, for example, and allowing the eccentrics to turn a fraction of a turn at predetermined time intervals. These time intervals may, for example, be chosen in such a way that regular wear of the cutting tools is obtained.

Conforming to the invention, the edges of the cutting tools are located in two vertical planes parallel to the axis of the band and are inclined with respect to a horizontal plane so as to divert the shavings toward the bottom between the stringers whence they can easily be removed by a suitable device.

In the case where the last pair or pairs of tools have their edges inclined so as to machine the band to provide a trapezoidal section, and where the stringers are set in motion by a circular movement of translation, the carriages supporting these tools which assure trapezoidal machining slide laterally in two parts mounted on the stringers so as to remain in the same horizontal plane while following the other movements of the stringers.

Conforming to another characteristic of the invention, each tool-carrier carriage comprises on each side two beds or grooves for tools situated one behind the other with respect to the direction of displacement of the band, and means for permitting one or the other of these tools to work on the band.

Conforming to the invention, it is also advantageous to be able to adapt the machine to the width of the machined bands. For this, it is sufficient to provide tables of different width which can be mounted successively on the machine and to vary the distance between the stringers by bringing them nearer together or separating them by the aid of a screw device, for example, the stringers being able eventually to be then set in the desired position by means of any appropriate device.

Likewise, the tool-carrier carriages can advantageously comprise three elements whose median element forms a cross-piece, and to adapt the separation of the tools to the width of the band by suitably selecting the length of the crosspieces.

In order to facilitate the regulation of the machine, it is also desirable to supply the rollers of the carriages of the tool-carriers with a regulating device which allows their separation to be varied within certain limits.

Also, the separation of the tools can be adjusted within the same limits by making them slide in the grooves which carry them.

With the purpose of making all the characteristics of the invention well understood, one method of accomplishment will be described now by way of non-limiting example, and shown on the drawing on which:

FIG. 1 is a view in elevation of a machine according to one particular method of practicing of the invention.

FIG. 2 is a plan view corresponding to the embodiment of FIG. 1.

FIG. 3 is a perspective view showing the movements of the different parts of the machine.

FIG. 4 is a lateral view of the frame of the machine from the side opposite to that shown in FIG. 1.

FIG. 5 is a view partially in cross section in larger scale along V—V of FIG. 1.

FIG. 6 is a view partially in cross section along VI—VI of FIG. 5.

FIG. 7 is a view in transverse section of an eccentric controlling the movement of the stringers.

FIG. 10 is a perspective view representing how two tools can be placed one behind the other on the tool-carrier.

FIG. 11 is a fragmentary side view showing the rod 62 seated in the tapered orifice 61 with the orifice shown in axial section.

Figure 8:
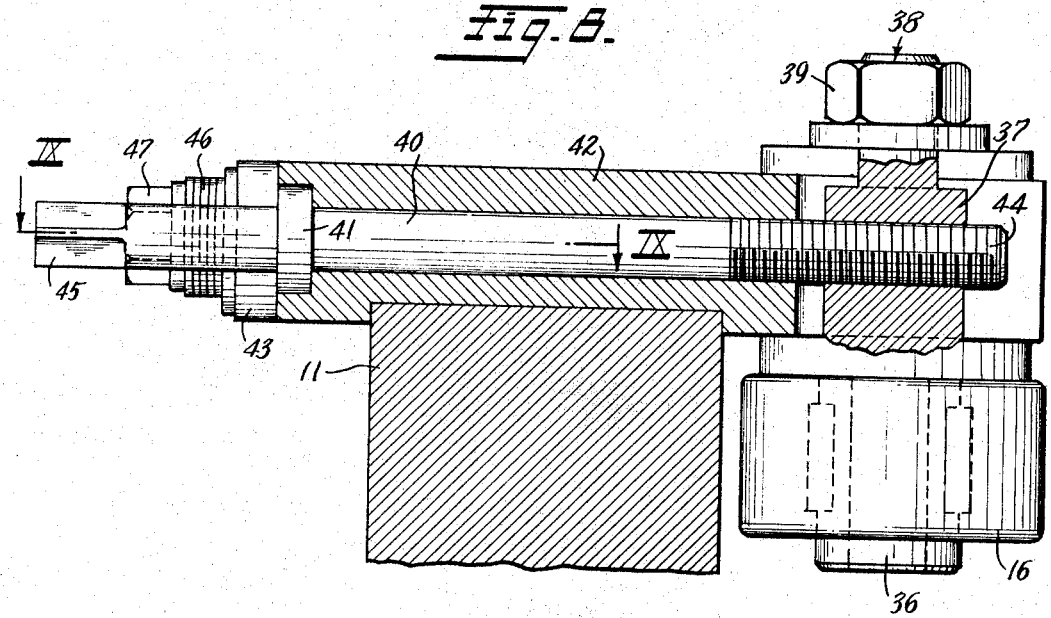
FIG. 8 is a view partly in section taken on the axis of one of the rollers of the tool-carrier carriage along VIII—VIII of FIG. 10.

It is seen in FIGS. 1 and 2 how the horizontal table 1 mounted at its two extremities on frame 2 of the machine supports the strip or band 3 to be machined which is carried along in the direction of arrows F by any means whatever, which can be advantageously constituted by the machine, to be shaped utilizing the machined band according to the invention.

Band 3 is settled on table 1 by a series of presser-rollers 4 mounted on shafts 5 whose extremities are pushed back elastically in the direction of the table by case 6 whose structure will be explained later in greater detail.

Two stringer pieces 7 and 8 located on either side of the table 1 are mounted on eccentric pivoting on frame 2 of the machine.

A band brake 9 shown in FIG. 1 avoids all untimely rotation of the eccentrics carrying stringer pieces 7 and 8 outside the moments when the rotation of these eccentrics are controlled by a device which will be described in greater detail later on. This brake 9 could evidently be replaced by any other suitable device.

Stringer pieces 7 and 8 have at their upper part dovetailed tracks 10 inside which the tool-carrier carriages 11 slide transversally.

Tracks 12 of tool-carrier carriages 13 are independent pieces engaging in grooves 14 of stringer pieces 7 and 8. They can follow the horizontal displacements of these latter, but cannot move vertically since they are maintained by supports 15 solid with the frame.

Each of these tool-carrier carriages 11 and 13 is moved horizontally by two rollers 16 placed on each side of band 3, so that they are obliged to glide horizontally in their tracks and to follow the turns of the band.

Each tool-carrier carriage is fitted with two pairs of tools 17 and 18 placed one behind the other, a single tool working on each side of the band so as to be able to change the other without interrupting the operation of the machine.

As can be clearly seen in FIG. 2, the pairs of tools encountered successively by the band reduce its width progressively to the desired value while the last pair of tools carried by the carriage 13 gives to the band the trapezoidal section which is desirable in certain cases.

In FIG. 3 stringer pieces 7 and 8 and tool-carriers 11 and 13 are shown. FIG. 3 further shows, clearly, the kinematics of the machine according to the invention.

Eccentrics 19 which support the stringer pieces 7 and 8 are driven in rotation by actuating device 20 shown by broken lines in FIG. 3, so that the stringer pieces undergo a displacement of circular translation which is shown schematically by a vertical component movement (arrows $Fv$) and horizontal component (arrows $Fh$).

The tool carriages 11 whose tracks are directly mounted on stringers 7 and 8 consequently also undergo the same movement as the stringer pieces, which can be shown by arrows $Fv$ and $Fh$.

On the other hand, supports 12 of tool-carrier carriage 13 are mounted as has been explained earlier, so as not to be capable of moving in a horizontal plane parallel to table 1, in such a way that carriage 13 escapes the displacement of component $Ev$ (stringer pieces 7 then moving with respect to supports 12) while it remains subjected to horizontal component $Fh$ of the movement of the stringer pieces.

Moreover, the tool carriages 11 and 13 both have the possibility of moving freely along the direction of arrows T i.e., in a direction perpendicular to the direction of displacement of the band.

As has been previously described, the tool carriages are guided by rollers 16 placed at or near the edges of the bands, so that the tools are activated on the one hand by movements along arrows $Fv$ and $Fh$ (or $Fh$ alone) which are imposed on them by stringer pieces 7 and 8, and on the other hand by transverse movements along T, which are communicated to them automatically by the band itself as a function of its curvature.

FIG. 4, which is a lateral view of the face of the machine opposite to the face of FIG. 1, shows the activating device of the eccentrics 19 which support stringer pieces 7 and 8.

This mechanism is constituted by a double-acting pneumatic or hydraulic cylinder 21, which acts on two ratchets 22 by means of cranks 23 and connecting rods 24 to make turn step by step the ratchet wheels 25 fixed to eccentrics 19 which support the stringer pieces.

It is understood in these premises that, while with the help of suitable control, the piston of cylinder 21 is moved to the left, eccentrics 19 are turned at a given angle, while as the piston of cylinder 21 is displaced toward the right, no rotation at all of the eccentrics is provoked by reason of the fact that ratchets 22 are disengaged with respect to wheels 25.

Cylinder 21 can be advantageously directed by a device of any kind whatever making it function at variable time intervals, but however suitably selected to obtain regular wear of the tools mounted on tool-carrier carriages 11.

FIG. 7 shows a section of a device allowing stopping the eccentrics in their bearings when they are not undergoing any rotation.

In FIG. 7 is shown a bearing 26 of eccentric 19, the circle shown in continuous lines corresponding to the active part of the eccentric which supports the stringer pieces.

A brake shoe 27 is constantly pushed toward eccentric 19 by a stack of elastic washers 28, so as to suppress any play between eccentric 19 and its bearing 26.

A cylinder 29 contains a piston 30 fixed to shoe 27 so that by sending a compressed fluid into conduit 31 the effect of the elastic washers 28 is counteracted, thus allowing the eccentric to be put in rotation.

Moreover, it is sufficient to appropriately connect conduit 31 to the control of cylinder 21 in order to free the eccentrics during the time when they are set in rotation and in order to stop them during the periods when they are stationary.

In FIG. 5, which shows in larger scale a partial section along V—V of FIG. 1 after raising tool-carrier carriage 13, table 1 is found again supporting band 3 represented by broken lines. Rollers 4 which are mounted on shaft 5 so as to be able to be regulated axially in position with respect to the latter, press band 3 against table 1.

FIG. 6 which is a sectional view of a guiding means 6 of the extremity of shaft 5, shows how shaft 5 which slides between parts 32 of the guide means is constantly pushed back toward the bottom by a shoe 33 on which a stack of elastic washers 34 act.

Nuts 35 permit blocking the elastic device after adjustment of the force with which the rollers 4 rest on band 3.

Also in FIG. 5 there is shown one of the stringer pieces 7 with respect to which slides track support 12 which carries one of the extremities of the tool-carrier carriage 13 not shown in FIG. 5.

Support 12 is also guided by two support members 15 mounted solidly to frame 2 of the machine and passing into two horizontal openings extended from each support 12.

Figure 9:
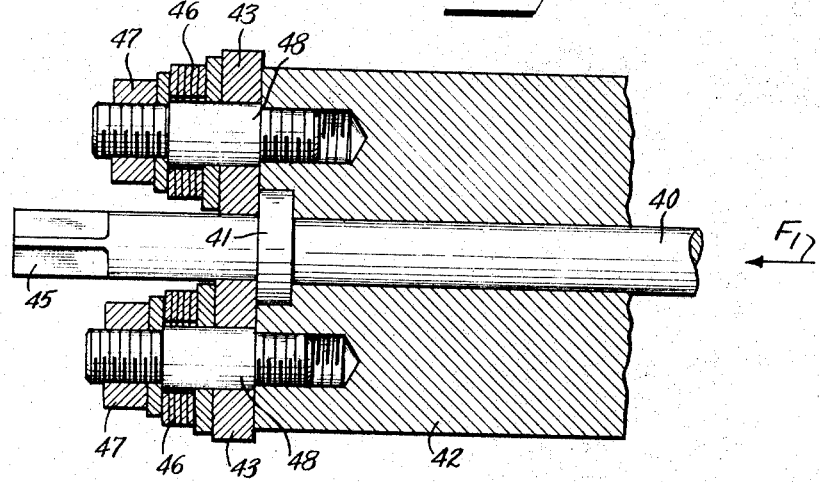
FIG. 9 is a partial section along IX—IX of FIG. 8.

FIGS. 8 and 9 show how guide rollers 16 are mounted on the tool-carrier carriages.

Axis 36 of roller 16 is extended by a part 37 forming a screw and threaded rod 38 on which a nut 39 is screwed.

A regulating rod 40 supplied with a shoulder 41 held fixed in support 42 of roller 16 by a plate 43 is engaged by its threaded part in screw 37.

It is understood in these conditions that in order to regulate the position of roller 16, it suffices after having very slightly loosened nut 39, to make the square extremity 45 of control rod 40 turn with a key.

Tightening nut 39 allows obtaining stoppage of the axis of roller 16 in the desired position.

FIG. 9 shows a section of the safety device which permits rod 40 to move toward the left in the direction of arrow Fl while the distance between two pairs of rollers 16 is less than the width of the plate passing between these rollers.

Such a condition should not, in principle, occur, but in the case where it may happen, a rapid deterioration of rollers 16 would ensue if they could not be separated from one another.

To this purpose plate 43 rests against roller bearer 42 under the effect of two stacks of elastic washers 46 held by nuts 47 which engage on threaded pins 48, themselves being fastened on support 42.

It is conceived, therefore, that in the case where a too-great pressure is exerted on roller 16, shoulder 41 can push back plate 43 to allow the passage of an extra-width of the band.

In FIG. 10 is the upper part of a stringer piece 7 with track 10 into which slides one of the extremities of a tool carriage 11, this latter being composed of two tool-carriers properly called 50 joined together by a cross-piece 51 by means of bolts 52 passing through orifices 53 and by screws not shown.

In FIG. 10 is found a roller 16 mounted on a tool-carrier 50 by means of its support 42, as has been described in the case of FIGS. 8 and 9.

Tools 17 and 18 are mounted in two grooves 54 and 55 made in tool-carrier 50 and are held there by stop screws 56 engaging in orifices 57 of plate 58, itself fastened on tool-carrier 50 by screws 59 engaging in the six orifices 60 with which it is fitted.

A tapped orifice 61 is made in the angle of each of the grooves 54 and 55, so as to be capable of receiving a threaded rod 62 which serves to regulate the axial position of the tool that it affects.

This threaded rod 62 which engages in the tapped orifice 61 is shown in medallion in larger scale. Its front extremity is cut and carries a head 63 engaging without play in a groove 64 made in the back part of the tool.

It is seen in these conditions that it is simple, after having loosened the screw of block 56, to regulate the position of the tool by means of threaded rod 62.

It can also be seen how this device permits replacing a worn tool while the other tool continues to work.

In addition, the machine according to the present invention can be perfected for adaptation to machining metallic bands of different widths.

For this purpose, changing table 1 in order to choose a table whose width is close to that of the band to be machined can easily be effected. Rollers 4 are then adjusted to the width of the band by making them slide over shafts 5.

Then, as has been previously explained, one has only to change cross pieces 51 of the tool-carrier carriages in order to change the distances between the rollers and between the tools, precision of regulation being obtained by acting on the threaded rod 44 of the roller-carrier and the threaded rods 62 which control the position of the tools.

Finally, in order to prevent the stringer pieces 7 and 8 from impeding the free fall of shavings toward the bottom, their separation can be regulated due to the fact that they can slide over eccentrics 19, their coming closer together or separating controlled by rods 66 supplied with reverse threading.

These threaded rods turn in bearings solidly with frame 2 and engage in screws nested in the stringer pieces so as to control the separation of these latter while allowing their back-and-forth motion.

Control of rods 66 is assured by chain 67 (FIG. 1) fitted with coupling screws 68 so as to assure synchronization of the screws.

It is well understood that the embodiment which has just been given by way of example, does not present any limiting character and can receive any desirable modifications without thereby departing from the scope and spirit of the invention.

Thus it follows that the displacement of the stringer pieces can be obtained by other than eccentric means, by utilizing for example hydraulic jacks or screw operated jacks.

Also it follows that instead of controlling all the tool-carrier carriages by the same couple of stringers, each tool-carrier carriage may be controlled by its own device.

Similarly the table could be displaced with respect to the tools instead of the reverse.

Also, it goes without saying that any number of tool-carrier carriages can be placed on the machine in function of the nature of the work to be accomplished.

What is claimed is:

1. Machine to smooth the edges of metal bands, comprising in combination: a stationary horizontal table on which the band is transported in the direction of its length while being pressed by presser-rollers, two stringer pieces placed on either side of the table and at least one tool-carrier carriage mounted on the stringer pieces so as to be able to slide freely transversely with respect to the band, and carrying a pair of tools machining each of the two edges of the band as well as a pair of rollers placed on either side of the band, wherein each of the two stringer pieces is mounted on two eccentrics carried along by the same rotation movement, so that the two stringer pieces and the tool-carrier carriages that they support are carried along by a circular translation movement.

2. Machine according to claim 1 wherein said eccentrics are set in rotation by means of a device drawn along by a pneumatic or hydraulic cylinder.

3. Machine according to claim 1 wherein the device rotating the eccentrics is such that these latter are rotated a fraction of a turn at determined time intervals.

4. Machine according to claim 3 wherein means are provided to vary said time intervals according to a law permitting obtaining even wear along the entire cutting edge of the tools.

5. Machine according to claim 1 wherein the carriages bearing the tools which give the band a trapezoidal section are mounted on stringer pieces by means of pieces sliding in these latter as well as on a horizontal support, so that the tools in question remain in the same plane parallel to the band at the same time that they follow the other displacements of the stringer pieces.

6. Machine according to claim 1 wherein means are provided to mount the rollers on tool-carrier carriages by means of an elastic safety device permitting the rollers to separate when the band accidentally presents a greater width.

7. Machine according to claim 1 wherein means are provided to accommodate tables of different widths in function of the width of the bands to be machined.

8. Machine according to claim 1 wherein a screw device is provided to vary the separation between the stringer pieces in such a way that these latter are slanted in a direction as to avoid impeding the free fall of the shavings.

9. Machine according to claim 1 wherein the tool-carrier carriages comprise two tool-carriers, joined by a cross-piece the effective length of which is adjustable as a function of the width of the band.

10. Machine according to claim 1 wherein each tool-carrier comprises a bed for two tools placed one behind the other, and a screw device acting on each tool to allow engagement and disengaged of each tool independently of the other.

11. Machine for smoothing the edges of metallic bands comprising in combination: means for displacing the band along its longitudinal axis while holding it firmly at a plane at the moment when it passes into the machine, and at least two carriages freely movable on the machine in the plane of the band and perpendicular to the direction of travel of the latter, each of the two carriages being guided in its planar motion by guide rollers resting on the edges of said band, and being furnished with a pair of cutting tools adapted to smooth each of the two edges of said band, the spacing of the tools of the successive carriages diminishing in the direction of displacement of the band.

12. Machine according to claim 11 in which the band is restrained by rollers which hold it to a table stationary with the frame of the machine, the sliding carriages being supported by two stringers, one on each side of the frame of the machine.

13. Machine according to claim 12 in which the stringers are supported by means which communicate simultaneously to them a displacement having a component perpendicular to the plane of the band and of an amplitude such that during said displacement, the position of the cutting edge of said cutting tools with respect to the band is periodically repeated.

14. Machine according to claim 13 in which the stringers are mounted on eccentrics and thereby simultaneously carried along in rotation.

15. Machine according to claim 13 in which at least one carriage is not subjected to a displacement having a component perpendicular to the plane of the band.

16. Machine according to claim 1 in which at least certain of the tools have inclined from the cutting edge thereof, with respect to the direction of travel of the band, in such a way that the active edge of the tool cutting through the edge of said band rejects the shavings formed toward the bottom of the machine.

17. Machine according to claim 1 in which the rollers of at least one carriage are mounted elastically in order to be able to admit accidental variations in the normally uniform width of the band.

18. Machine according to claim 11 in which at least one carriage comprises two pairs of tools working alternately, the tools at rest being brought into working position during the work period of the other tools and inversely.

References Cited

UNITED STATES PATENTS

| | | | |
|---|---|---|---|
| 2,220,182 | 11/1940 | Titus | 90—24 |
| 2,242,815 | 5/1941 | Darner | 90—24 |
| 2,318,732 | 5/1943 | Yoder | 90—24 |
| 3,254,568 | 6/1966 | Pickard | 90—24 |

WILLIAM W. DYER, Jr., *Primary Examiner.*